H. J. STOTTMAN.
RESILIENT SUPPORT FOR TIRE CASINGS.
APPLICATION FILED MAY 4, 1920.
1,362,447.
Patented Dec. 14, 1920.
2 SHEETS—SHEET 1.
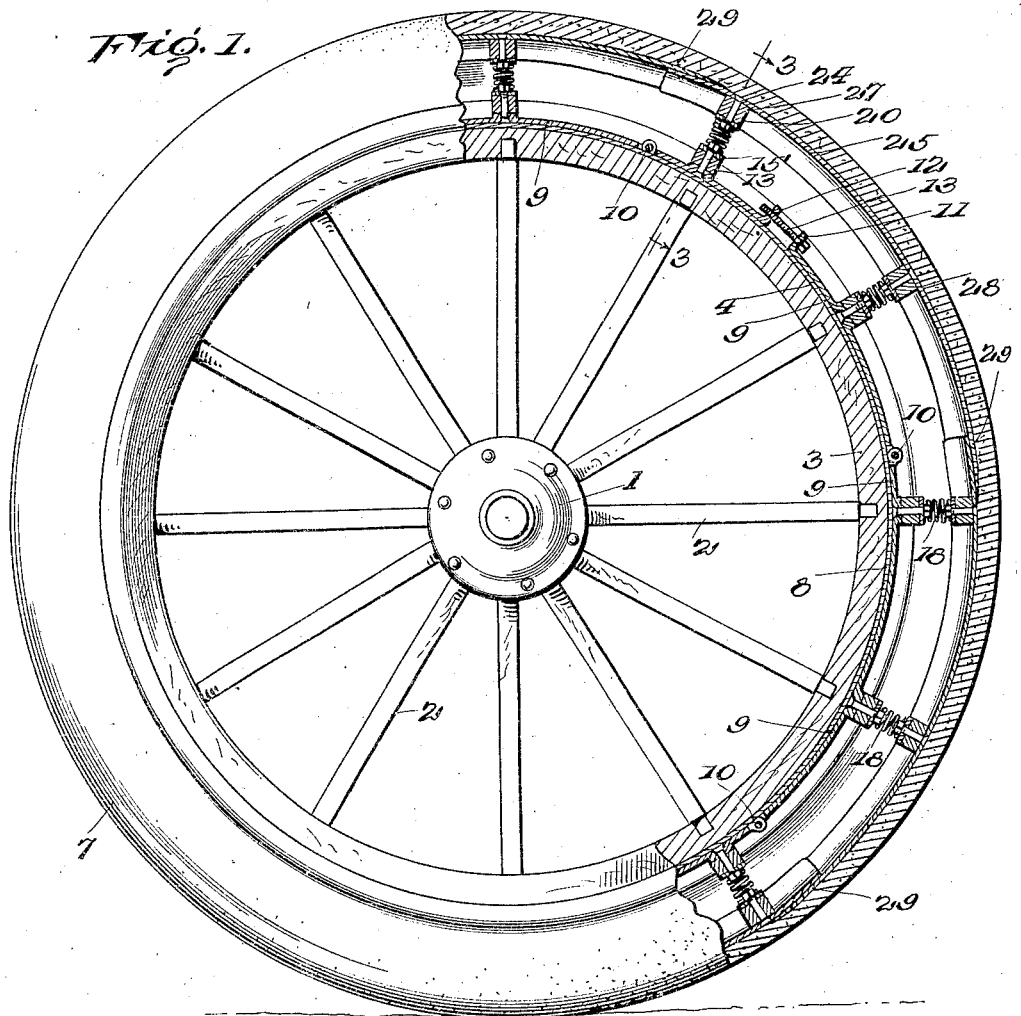
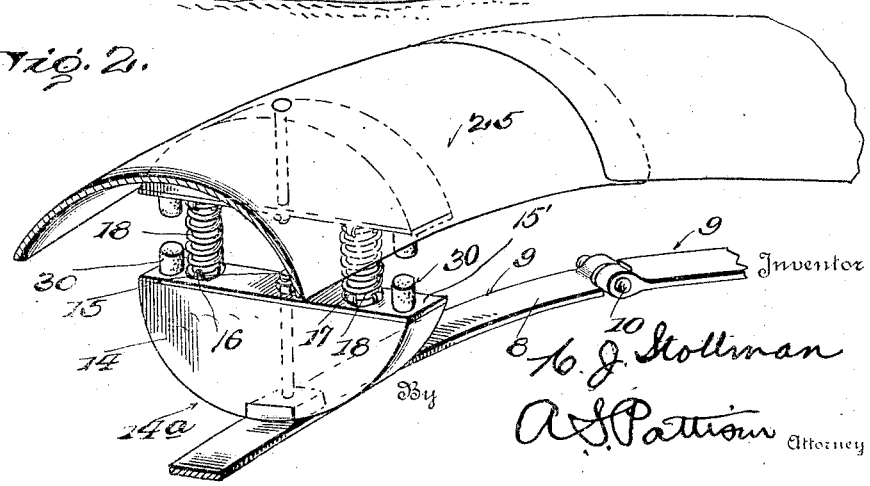

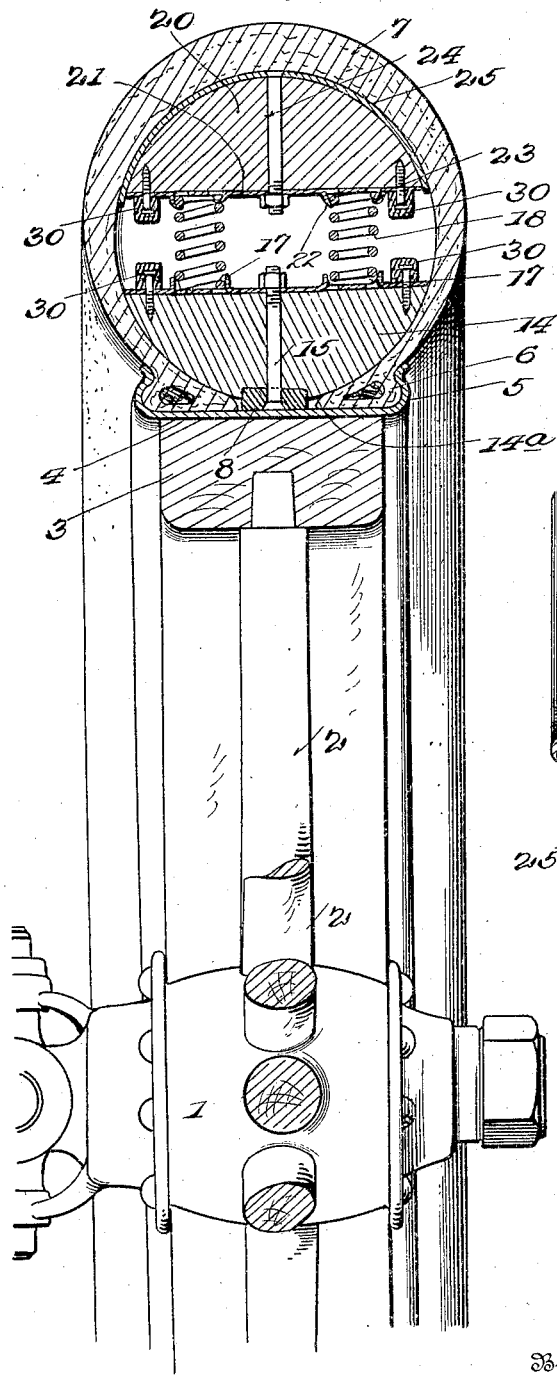
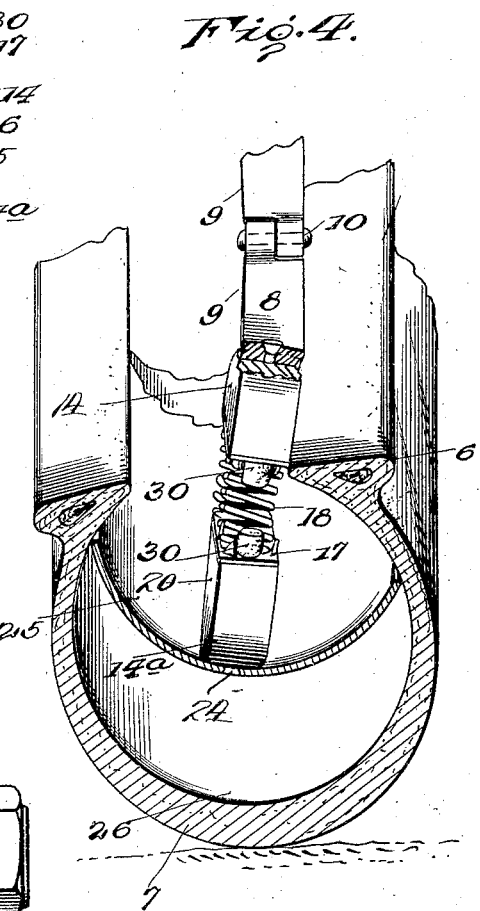

UNITED STATES PATENT OFFICE.

HERMAN J. STOTTMAN, OF COVINGTON, KENTUCKY.

RESILIENT SUPPORT FOR TIRE-CASINGS.

1,362,447.   Specification of Letters Patent.   Patented Dec. 14, 1920.

Application filed May 4, 1920. Serial No. 378,813.

*To all whom it may concern:*

Be it known that I, HERMAN J. STOTTMAN, a citizen of the United States, residing at Covington, in the county of Kenton and State of Kentucky, have invented certain new and useful Improvements in Resilient Supports for Tire-Casings, of which the following is a specification, reference being had therein to the accompanying drawing.

My invention relates to improvements in resilient supports for tire casings, and more particularly to supports for use in automobile tire casings.

The object of my invention is to provide a resilient supporting means for pneumatic tire casings whereby the resiliency of the tire is preserved without the use of an inner tube which is common to such tire casings.

A further object of my invention is to provide a resilient supporting means for pneumatic tires which takes the place of the usual inner tube and thereby obviates punctures and blow-outs.

A further object of my invention is to so construct my improved resilient supporting means for tire casings that it will support the casing in its natural contour and at the same time insure easy riding and absorption of bumps and jars.

A still further object of my invention is to provide an improved resilient supporting means for tire casings which can be applied to the usual wheel and tire casing now found in use.

Other and more specific objects will now fully appear in the following specification and claims.

Referring now to the drawings—

Figure 1 is a side view in elevation of a wheel and the casing, partly broken away and shown in section, showing my improved supporting means as applied to the wheel rim and the tire casing.

Fig. 2 is a detached perspective view showing a portion of the spring supported element of my invention.

Fig. 3 is a cross-section taken on the line 3—3 of Fig. 1, showing a tire containing my invention.

Fig. 4 is sectional perspective view showing the position of the wooden blocks when being placed in the tire.

Referring now to the drawings wherein similar characters designate corresponding parts throughout the several views, 1 denotes the hub of a wheel, 2 the wheel spokes, 3 the wheel felly and 4 is the tire wheel rim which is of the usual type for use with clencher tires, being provided with upwardly projecting edges 5 for receiving the beaded edges 6 of the tire casing 7.

Completely encircling the rim 4 of the wheel and lying thereon between the beads 6 of the casing is a wheel-ring 8, comprising a plurality of sections 9, hinged as at 10, so as to enable the ring to conform to the circular rim, the end sections of the ring 8 having upturned ends 11 and 12, which are drawn and fastened together by a bolt 13.

By this construction the wheel ring can be made to fit a wheel of any circumference by increasing or decreasing the number of ring sections and tightening them through the medium of the bolt 13.

At predetermined points upon the wheel-ring 8, preferably one above each spoke of the wheel, are semi-circular wooden blocks 14, having their rounded faces 14ª fastened transverse the wheel ring by means of bolts 15. The flat faces of the blocks carry metal plates 15′, which are provided with raised portions 16 to receive the lower ends 17 of the coil springs 18, which support the semi-circular wooden blocks 20.

The blocks 20 have flat faces carrying the metal plates 21, which are provided with raised portions 22 to receive the upper ends 23 of their supporting coil springs 18, and carry upon their rounded faces, by means of the bolts 24, the metal plate sections 25, which are substantially semi-circular in the transverse direction of the tire casing and engage and fit snugly the inner rounded contour 26 thereof.

There are two supporting blocks and intermediate coil springs to each tire engaging metal plate section, as clearly shown in Fig. 1, one supporting block being positioned very close to one end of the section, as at 27, the other supporting block being positioned at about the center of its length as at 28.

The tire engaging plate sections overlap each other, as shown at 29, Fig. 1, the plate ends, which carry supports, supporting the plate ends of the adjoining plates which have no end supports.

By the foregoing disclosure and description it will be clearly seen that I have provided a tire casing supporting means whereby the casing is supported at every point in its circumference and thereby lessen the possibility of cracking or bursting the casing. Also it will be readily understood that my invention can be applied to casings of varied sizes and structures and I do not limit myself to the type of tire casing here shown and described.

Due to the springs 18 a very resilient tire supporting means is provided, the semi-circular shape of the blocks 14 and 20 and the tire-engaging metal plates 25, the casing is supported in its natural shape while the blocks receive a lateral support from the casing and to further safe-guard against any jar which might arise by the complete compression of the coil springs I have provided the flat adjoining faces of both the upper and lower blocks with buffers 30.

In Fig. 4 of the drawings I have shown my tire supporting means being applied to a tire casing.

My entire supporting element can be assembled before it is applied to a tire casing. When the apparatus is assembled, the tire is turned with its edges upward, and the tire engaging plate 25 is pushed downward past the beads 6 of the tire casing, as shown in Fig. 4. To facilitate the application of the invention, the blocks 14 and 20 are turned upon their respective bolts until they are in a line with the wheel ring 8. After the plates 25 have been pushed snugly against the inner face of the casing the blocks are turned transverse the wheel-ring and tire-casing and the casing is then ready to be mounted, in the usual way, upon a rim. It will be understood that due to the fact that the blocks can be turned in a line with the wheel ring the supporting plates can be tilted and inserted into the tire casing in an edgwise manner until they are past the upper edges of the casing. If this were not possible it would be a very difficult task to pass the plates through the narrow space between the edges of the tire casing. Once the plates are started into the tire they can be readily pushed into proper position.

Having thus described my invention what I claim and desire to secure by Letters Patent is:

1. A resilient support for tire casings, comprising a wheel ring, a plurality of pairs of blocks separated by springs, the blocks having curved outer edges, the curved edge of the inner block of each pair being connected to the ring, and sectional curved plates connected to the curved edges of the outer blocks.

2. A resilient support for tire casings, comprising a wheel ring, a plurality of pairs of blocks, each pair comprising an inner and an outer block, the blocks of each pair separated by springs, the blocks having curved outer edges, the center of the curved edges of the inner blocks connected with the wheel ring, and curved plates connected to the curved edges of the outer blocks, and yielding buffers arranged between the inner edges of each pair of blocks, for the purpose described.

3. A resilient support for tire casings, comprising a wheel-ring, a plurality of pairs of blocks, each pair comprising an inner and outer block, springs between and separating the blocks of each pair, the outer edges of the inner and outer blocks being curved, the curved edges of the inner blocks connected at their centers with the wheel-ring, and curved plates secured to the rounded edges of the outer blocks.

4. A resilient support for tire casings, comprising a wheel-ring, a plurality of pairs of blocks connected to the ring, each pair comprising inner and outer blocks, spiral springs between and connecting the blocks of each pair in separated relation, the blocks having curved outer edges, a plurality of plates curved in cross-section connected to the curved outer edges of the outer blocks, the ends of the plates overlapping, for the purpose described.

5. A resilient support for tire casings, comprising a wheel-ring, a plurality of pairs of resiliently separated blocks connected with the wheel-ring, the blocks having curved outer edges, a plurality of plates curved in cross-section and connected to the outer curved edges of the outer blocks, the plates having their ends overlapping for the purpose described.

6. A resilient support for tire casings, comprising a wheel-ring, a plurality of plates curved in cross-section and having their ends overlapping, a plurality of pairs of resiliently separated blocks having curved outer edges, arranged between the ring and the plates, each plate engaging two of the blocks arranged intermediate the ends of each plate.

7. A resilient support for tire casings, comprising a wheel-ring, a plurality of pairs of resiliently separated blocks connected with the ring on radially arranged pivots, the outer edges of the blocks being curved, and a plurality of plates curved in cross-section and secured to the outer curved edges of the outer blocks, whereby the blocks may be turned on their pivots to facilitate applying them to the tire casings.

8. A resilient support for tire casings, comprising a wheel-ring composed of sections transversely pivoted at their ends, a plurality of pairs of resiliently separated blocks attached to the sections of the wheel-ring, the blocks having curved outer edges and a plurality of plates curved in cross-section applied to the outer edges of the outer blocks, the plates having overlapping ends.

9. A resilient support for tire casings, comprising a wheel-ring made up of a plurality of sections having their ends transversely pivoted, and a screw connection for adjusting the length of the ring, a plurality of pairs of resiliently separated blocks connected to the sections of the ring, the outer edges of the blocks being curved, and a plurality of plates curved in cross-section and attached to the outer curved edges of the outer blocks, the ends of the plates overlapping, for the purpose described.

In testimony whereof I hereunto affix my signature.

HERMAN J. STOTTMAN.